Feb. 12, 1929.

C. P. SHAW 1,701,546

BLANKING DIE AND METHOD OF MAKING THE SAME

Filed Oct. 6, 1926 2 Sheets-Sheet 1

INVENTOR.
Charles P. Shaw
BY
Stuart C. Barnes
ATTORNEY.

Feb. 12, 1929.                                      1,701,546
C. P. SHAW
BLANKING DIE AND METHOD OF MAKING THE SAME
Filed Oct. 6, 1926        2 Sheets-Sheet 2

INVENTOR.
Charles P. Shaw.
BY
Stuart C. Barnes
ATTORNEY.

Patented Feb. 12, 1929.

1,701,546

UNITED STATES PATENT OFFICE.

CHARLES P. SHAW, OF DETROIT, MICHIGAN.

BLANKING DIE AND METHOD OF MAKING THE SAME.

Application filed October 6, 1926. Serial No. 139,879.

This invention relates to dies and has to do more particularly with blanking dies for blanking out shapes from sheet material, and with the method for making the dies.

Heretofore such dies have been made from die steel, and the punch and the die were made and machined separately. This procedure is expensive, in that it involves considerable time and labor and, furthermore, there is apt to be errors made when the punch and die are made separately, so that the two members do not properly cooperate with each other, and in this case it has been necessary to make entirely new members.

The present invention aims to provide a punch and a die which are made at the same time and by the same operation, so that accuracy as between the two members is assured. According to the invention the punch and the die are made from a section of laminated metal and the shape to be formed is cut out of the metal. Certain of the layers of the material may be used as a punch, and the remaining material as a die. The shape is preferably cut out of metal which is relatively soft and, in order to provide a cutting edge, a rule of hard steel is used in the kerf formed by the cutting tool. Due to the fact that the die is made up of several laminations of metal, the life of the die is lengthened, for as the cutting rule wears down, a lamination may be removed from time to time.

The invention is somewhat diagrammatically shown in the accompanying drawings wherein.

Figure 4:
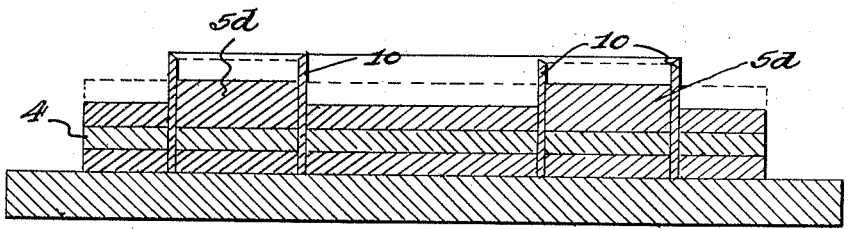

Fig. 4 indicates how a lamination may be removed as the rule wears down so as to prolong the life of the die.

Figure 5:
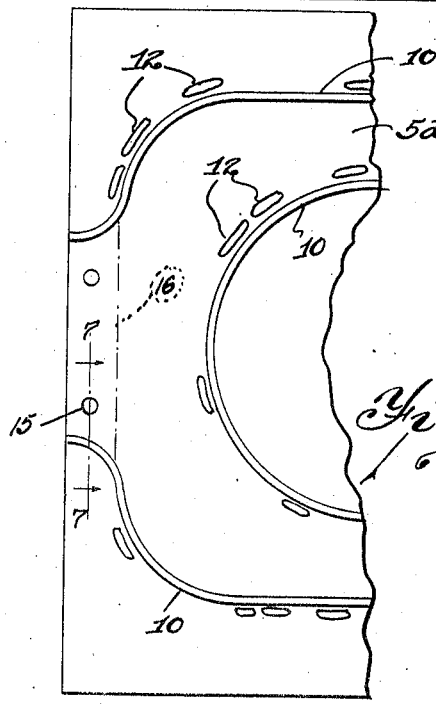

Fig. 5 is a plan view showing how the metal may be peened over in order to accurately position the cutting rule.

Figure 6:
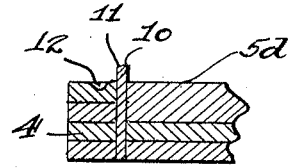

Fig. 6 is an enlarged detail showing the metal of the die peened over.

Figure 7:
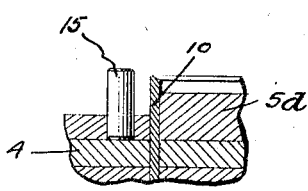

Fig. 7 is an enlarged section taken on line 7—7 of Fig. 5.

Figure 1:
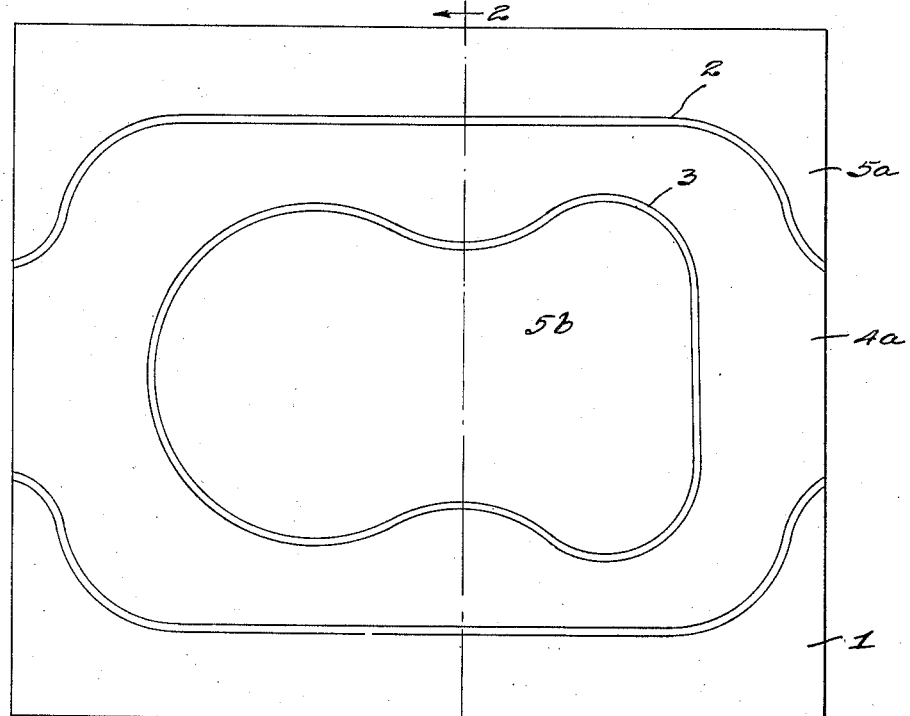
Fig. 1 is a plan view of a section of laminated metal, showing how the shape to be formed is cut in the metal, the shape in the present instance being that of a gasket for the head of a cylinder.

A piece of laminated material, preferably steel, is shown in Fig. 1. The laminations are securely held together and the design of the blank to be formed is cut in the metal by means of a saw or routing tool. In the present instance, the design cut is for the blanking out of a gasket for a cylinder head, and the saw kerfs are indicated as at 2 and 3.

Figure 2:
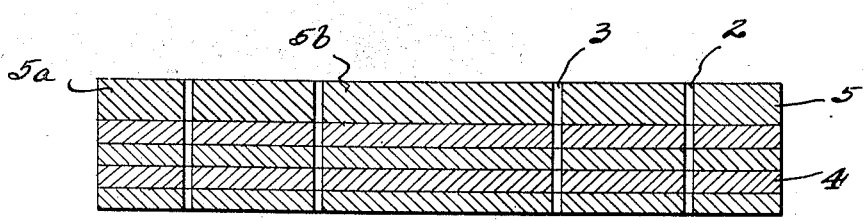
Fig. 2 is a sectional view taken on line 2—2 of Fig. 1, showing the kerfs formed by the cutting tool.
Figure 3:
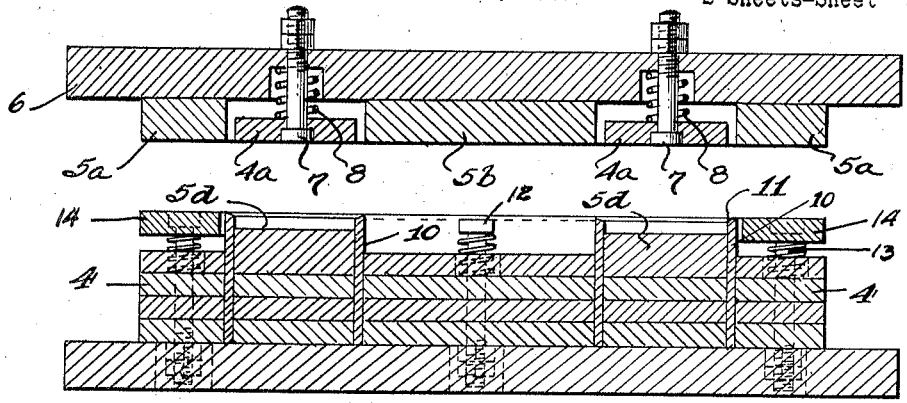
Fig. 3 is a sectional view through the punch and the die showing how the punch and strippers are formed by the use of certain laminations.

As shown in Fig. 2, the metal material is made up of a number of relatively thin laminations 4, and a relatively thick lamination 5. The exterior part of the lamination 5 represented at 5ª and the interior part of the lamination, represented at 5ᵇ are removed and are used as a punch. As shown in Fig. 3 these members, after being removed, may be fastened on to a support or base 6. The portion 5ᵈ of this lamination, which lies between the kerfs 2 and 3, remains with the part which forms the die.

As shown in Fig. 3, the portion 4ª of a relatively thin lamination which lies between the two saw kerfs is removed and is secured to the base 6 and used as a stripper. The portion 4ª is held to the base 6 by bolts 7, and it is pressed outwardly by coil springs 8.

This leaves the member which forms the die, in the shape shown in Fig. 3. Cutting rule 10 is placed in the kerfs formed by the saw, and the upper edges of the rule may be beveled or sharpened, as at 11. This rule extends slightly above the upper edges of the die member and, due to the fact that the die member, the punch member, and the strippers are formed by the single operation of cutting out the design to be blanked, an accurate fit between the several parts is obtained.

In the operation of the device, the metal from which the design is to be blanked is placed between the two members shown in Fig. 3, and then the two members are brought together and the design punched out. Preferably, the punch member is the movable one. If, from time to time, the rules become dull they may be sharpened by suitable beveling. After the rules have become worn down to a considerable extent, one of the laminations of the die member may be removed so that the rules are caused to project above the upper edge of the die member. This is represented at Fig. 4. In this figure the dotted lines indicate the lamination which has been removed, and it will be observed that the rule was worn down until it projected very slightly above the surface of the die member, but that after the lamination was removed, the rules again projected sufficiently above from the die member. This removal of the laminations may be continued again and again depending upon the number of laminations which are used in the original piece of metal, and thus the life of the die is lengthened.

The metal which is used to form the punch and the body of the die is of relatively soft steel. The rule which is used may be placed in the saw kerfs while in a hardened condition if conditions permit, or it may be placed in the saw kerfs while in a semi-hardened condition. If the rule is placed in the kerfs while in a semi-hardened condition, the whole die can be subjected to hardening treatment to harden the rule, and since the rule is of quite thin material, the hardening treatment is brief so that the treatment does not materially harden the mass of metal which forms the body part.

It is possible that the rule, sometimes, will not be in an accurate position when it is first placed in the kerf. In order to correct this, the metal which forms the body portion of the die may be peened over, as shown at 12. This peening over is shown in an enlarged way in Fig. 6, and the metal is somewhat distorted so that pressure is obtained on the rule to correct its position. This peening over may be done on either side of the rule, according to the way in which its position must be corrected. Moreover, should the metal parts which form the punch be slightly inaccurate, they may also be peened over to correct such inaccuracy, due to the fact that they are made out of relatively soft steel.

The die has been shown and described as being made from a laminated piece of metal which included a thick layer and several thin layers. This is perhaps desirable in order that the punch will be of material thick enough for the purpose, although it will be understood that the invention is not so limited as the die might well be made from material in which all the laminations are of the same thickness.

The die member is preferably used with knock-out devices for knocking out the metal after the design has been cut. There will be a piece of metal lying centrally of the die member and this is removed by means of a spring pressed bolt 12. It will be understood that when the punch moves down over the die, the bolt 12 is pushed downwardly against the action of the coil spring by the portion 5$^b$ of the punch, and that as the punch moves upwardly the piece of metal is removed from the die by the reaction of the bolt.

In a similar manner a knock-out device may be used on the exterior of the die, as is shown at 13. This knock-out may be of the same bolt structure as the knock-out 12, or it may be an enlarged head-like arrangement such as shown at 14. This member 14 may be mounted on several bolts 13 and may extend the entire width of the die. This arrangement of knock-outs keeps the sheet of metal somewhat rigid when the punch comes down upon it, and aids the punch and the cutting rule in severing the metal.

It is desirable to have as little interference as possible with the rule, and in order to keep the strippers 4$^a$ of the punch, from striking the rule, pins 15 may be used, Fig. 7. These pins are preferably slightly higher than the upper edge of the rule, so that when the punch comes down the pin strikes the stripper and forces it back into the punch member and thus prevents the stripper from hitting the cutting rule. These pins are preferably placed at the side of the die (Fig. 5) so that they lie outside of the edge of the material which is being cut. In Fig. 5, the position of the edge of the material which is to be cut is shown by the dot and dash line 16. It will thus be observed that the pins contact directly with the stripper and in this manner embossing of the shape, which is cut by the dies, is prevented. It will be understood that if the pins were placed within the line 16, that the pins would come in contact with the metal as the punch moves downwardly and would emboss the metal.

I claim:

1. The method of making blanking dies which comprises cutting the shape to be blanked out of a piece of laminated metal, removing a portion of one lamination for use as a punch, inserting a cutting rule in the remaining metal in the kerf formed by the cutting tool, and using the same as a die.

2. The method of making blanking dies which comprises, cutting the shape to be blanked out of a piece of laminated metal, removing a portion of one lamination for use as a punch, inserting a cutting rule in the kerf formed by the cutting tool which has a thickness substantially equal to the width of the kerf, and using the same as a die.

3. The method of making blanking dies which comprises, cutting the shape to be blanked out of a piece of laminated metal, removing a portion of one lamination for use as a punch, inserting a cutting rule in the kerf formed by the cutting tool which has a width greater than the height of the remaining laminations, and using the same as a die.

4. The method of making blanking dies which comprises, cutting the shape to be blanked out of a piece of laminated metal, removing a portion of one lamination for use as a punch, inserting a cutting rule in the kerf formed by the cutting tool, and using the same for a die, and removing laminations from the die from time to time as the cutting rule wears down.

5. The method of making blanking dies which comprises, cutting the shape to be blanked out of a piece of laminated metal, removing a portion of one lamination for use as a punch, inserting a cutting rule in the kerf formed by the cutting tool, and using the same as a die, and correcting the position of the cutting rule by peening over the metal adjacent thereto.

6. The method of making blanking dies which comprises, cutting the shape to be blanked out of a piece of laminated metal, removing a portion of one lamination for use as a punch, removing another portion of a lamination for use as a stripper, and using the remaining metal as a die.

7. The method of making blanking dies which comprises, cutting the shape to be blanked out of a piece of laminated metal, removing a portion of one lamination for use as a punch, removing a portion of a lamination for use as a stripper, inserting a cutting rule in the kerf formed by the tool and using the same as a die.

8. The method of making blanking dies which comprises, cutting the shape to be blanked out of a piece of laminated metal, removing a portion of one lamination for use as a punch, correcting the shape of the punch by peening over the metal adjacent the edge thereof, and using the remaining part of the laminated metal piece as a die.

9. The method of making blanking dies which comprises, cutting the shape to be blanked out of a piece of laminated metal, removing a portion of one lamination for use as a punch, correcting the shape of the punch by peening over the metal adjacent the edge thereof, and inserting a cutting rule in the kerf formed by the cutting rule and using the same as a die.

10. A blanking die comprising a die formed of a piece of laminated metal in which the shape to be blanked out is cut, a punch which is formed by a part of one of the laminations, said part being removed, and a cutting rule in the kerf formed by the cutting tool, said cutting rule being of a thickness substantially equal to the width of the kerf.

11. A blanking die comprising a die formed of a piece of laminated metal in which the shape to be blanked out is cut, a punch which is formed by a part of one of the laminations, and a cutting rule in the kerf formed by the cutting tool, said cutting rule being of a thickness substantially equal to the width of the kerf, and said cutting rule projecting above the upper surface of the die.

12. A blanking die comprising a die formed of a piece of laminated metal in which the shape to be blanked is cut, and a punch which is formed by a part of one of the laminations, a cutting rule in the kerf formed by a cutting tool, the metal of the die adjacent the rule being peened over to position the rule.

13. A blanking die comprising, a die formed of a piece of laminated metal in which the shape to be blanked is cut, a punch which is formed by a part of one of the laminations, the metal of the punch being peened over to correct the shape thereof, and a cutting rule in the kerf formed by the cutting tool.

14. A blanking die, comprising a die provided with a cutting rule, a punch having a stripper, and means on the die for preventing the stripper from contacting with the cutting rule.

15. A blanking die comprising a die provided with a cutting rule, a punch having a stripper, and pins on the die for contacting with the stripper to prevent it from contacting with the cutting rule.

16. A blanking die comprising a die provided with a cutting rule, a punch having a stripper, and means on the die for contacting with the stripper to prevent it from contacting with the cutting rule, said means projecting above the edge of the cutting rule.

17. A blanking die comprising a die provided with a cutting rule, a punch having a stripper, and means on the die for contacting with the stripper to prevent it from contacting with the cutting rule, said means being positioned on the die beyond the edge of the material which is being blanked.

In testimony whereof I affix my signature.

CHARLES P. SHAW.